US007813961B2

(12) United States Patent
Wittmer et al.

(10) Patent No.: US 7,813,961 B2
(45) Date of Patent: Oct. 12, 2010

(54) SYSTEM AND METHOD FOR PLANNING, ALLOCATION, AND PURCHASING

(75) Inventors: Holger Wittmer, Völklingen (DE); Andreas Freitag, Saarbrucken (DE); Thomas Gabelmann, Kirkel (DE); Berthold Simon, Kirkel-Limbach (DE)

(73) Assignee: SAP AG, Walldorf (DE)

( * ) Notice: Subject to any disclaimer, the term of this patent is extended or adjusted under 35 U.S.C. 154(b) by 129 days.

(21) Appl. No.: 11/028,459

(22) Filed: Jan. 3, 2005

(65) Prior Publication Data

US 2005/0197918 A1 Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 30/00* (2006.01)
(52) U.S. Cl. ........................................................ 705/26
(58) Field of Classification Search ................. 705/26, 705/27, 14
See application file for complete search history.

(56) References Cited

U.S. PATENT DOCUMENTS

| 5,400,253 | A |   | 3/1995  | O'Connor |            |
|-----------|---|---|---------|----------|------------|
| 5,712,995 | A |   | 1/1998  | Cohn     |            |
| 5,758,327 | A | * | 5/1998  | Gardner et al. | 705/26 |
| 5,929,854 | A |   | 7/1999  | Ross     |            |
| 5,930,771 | A |   | 7/1999  | Stapp    |            |
| 5,970,475 | A | * | 10/1999 | Barnes et al.  | 705/27 |
| 5,999,914 | A |   | 12/1999 | Blinn et al. |        |
| 6,029,139 | A |   | 2/2000  | Cunningham et al. |   |
| 6,151,608 | A | * | 11/2000 | Abrams    | 707/204   |
| 6,215,490 | B1 |  | 4/2001  | Kaply    |            |

(Continued)

FOREIGN PATENT DOCUMENTS

JP   2004-030343   1/2004

OTHER PUBLICATIONS

Hughes, G. David, Business Computer Systems. Boston: May 1984. vol. 3, Iss. 5; p. 33, 3 pgs. http://proquest.umi.com/pqdweb?did=1912017&sid=10&Fmt=2&clientId=19649&RQT=309&VName=PQD.*

(Continued)

*Primary Examiner*—Mila Airapetian
(74) *Attorney, Agent, or Firm*—Foley & Lardner LLP

(57) ABSTRACT

A method of integrating planning, purchasing, and allocation of goods in a computerized system is disclosed. The method includes providing a purchase order workbench for generating a purchase order list based on received purchasing data. The purchase order list includes a plurality of items and associated purchasing data for each item. The method further includes providing a planning workbench for applying one or more budget rules to the plurality of items in the purchase order list to determine whether the purchase of the items in the purchase order list should be approved based on the application of the one or more budget rules, providing an allocation workbench for generating an allocation table. The allocation table includes at least one of the plurality of items from the purchase order list that has been approved for purchase and a designation of a sales location for each item. The method yet further includes providing a system interface configured to access the purchase order, planning, and allocation workbenches.

24 Claims, 11 Drawing Sheets

U.S. PATENT DOCUMENTS

| | | |
|---|---|---|
| 6,507,851 B1 | 1/2003 | Fujiwara et al. |
| 6,831,666 B1 | 12/2004 | Kreis |
| 6,868,528 B2 | 3/2005 | Roberts |
| 6,910,017 B1 | 6/2005 | Woo et al. |
| 6,980,966 B1 | 12/2005 | Sobrado et al. |
| 7,092,929 B1 | 8/2006 | Dvorak et al. |
| 7,117,165 B1 | 10/2006 | Adams et al. |
| 7,117,451 B2 | 10/2006 | Sielken |
| 7,117,452 B1 | 10/2006 | Pavelski et al. |
| 7,124,373 B1 | 10/2006 | Patil |
| 7,139,731 B1 | 11/2006 | Alvin |
| 2001/0034559 A1 | 10/2001 | Brown et al. |
| 2001/0039517 A1 | 11/2001 | Kawakatsu |
| 2002/0023500 A1 | 2/2002 | Chikuan et al. |
| 2002/0026368 A1 | 2/2002 | Carter |
| 2002/0054141 A1 | 5/2002 | Yen et al. |
| 2002/0059108 A1 | 5/2002 | Okura et al. |
| 2002/0078159 A1* | 6/2002 | Petrogiannis et al. ....... 709/206 |
| 2002/0107713 A1 | 8/2002 | Hawkins |
| 2002/0122066 A1 | 9/2002 | Bates et al. |
| 2002/0123930 A1 | 9/2002 | Boyd et al. |
| 2002/0147668 A1 | 10/2002 | Smith et al. |
| 2002/0184116 A1 | 12/2002 | Tam et al. |
| 2003/0023500 A1 | 1/2003 | Boies et al. |
| 2003/0028437 A1 | 2/2003 | Grant et al. |
| 2003/0046120 A1 | 3/2003 | Hoffman et al. |
| 2003/0046195 A1* | 3/2003 | Mao ............................ 705/30 |
| 2003/0117440 A1 | 6/2003 | Hellyar et al. |
| 2003/0158791 A1 | 8/2003 | Gilberto et al. |
| 2003/0172007 A1 | 9/2003 | Helmolt et al. |
| 2003/0212617 A1* | 11/2003 | Stone et al. ................... 705/30 |
| 2003/0229502 A1 | 12/2003 | Woo |
| 2004/0098358 A1 | 5/2004 | Roediger |
| 2004/0113934 A1 | 6/2004 | Kleinman et al. |
| 2004/0148136 A1 | 7/2004 | Sasaki et al. |
| 2004/0162763 A1 | 8/2004 | Hoskin et al. |
| 2004/0186783 A1 | 9/2004 | Knight et al. |
| 2004/0220861 A1 | 11/2004 | Morciniec et al. |
| 2004/0267674 A1 | 12/2004 | Feng et al. |
| 2005/0055283 A1 | 3/2005 | Zarovinsky |
| 2005/0060270 A1 | 3/2005 | Ramakrishnan |
| 2005/0086122 A1 | 4/2005 | Cirulli et al. |
| 2005/0096963 A1 | 5/2005 | Myr et al. |
| 2005/0102192 A1 | 5/2005 | Gerrits et al. |
| 2005/0102227 A1 | 5/2005 | Solonchev |
| 2005/0165659 A1 | 7/2005 | Gruber |
| 2005/0261954 A1* | 11/2005 | Aoyama et al. ............... 705/10 |
| 2006/0020512 A1 | 1/2006 | Lucas et al. |
| 2006/0036507 A1 | 2/2006 | Pujar et al. |
| 2006/0112099 A1 | 5/2006 | Musgrove et al. |
| 2008/0125906 A1* | 5/2008 | Bates et al. ................. 700/241 |

OTHER PUBLICATIONS

U.S. Appl. No. 60/374,892, filed Apr. 22, 2002, Krajec.

"Beyond Markdown Management", summer/autumn 03, the 4caster, Iss 4, vol. 2.

"Retailers Manage Markdown Challenges Using i2 Solutions", Jan. 13, 2003, NFR 92nd Annual Convention & Expo, 2 pgs.

Melcher, Rachel, "Local tech firm creates retail markdown tool", Mar. 24, 2000, Cincinnati Business Courier, 3 pgs.

ProfitLogic, available at http://web.archive.org/web/20020603118338/http://profitlogic.com/, available at least by Apr. 15, 2005 (22 pp.).

Subrahmanyan et al., "Developing optimal pricing and inventory policies for retailers who face uncertain demand", Journal of Retailing, vol. 72, No. 1, Spring, 1996 (p. 7 (24)).

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Kelkar et al., Price Modeling in Standards for Electronic Product Catalogs Based on XML, 2002, pp. 366-375.

Srinivasan et al., Concepts and strategy guidelines for designing value enhancing sales promotions, Journal of Product and Brand Management, vol. 7, No. 5, 1998, pp. 410-420.

Abraham et al., "An Implemented System for Improving Promotion Productivity Using Store Scanner Data", Marketing Science, Summer 1993, vol. 12, No. 3, pp. 248-269.

Notice of Allowance for U.S. Appl. No. 11/074,367, mail date Nov. 30, 2009, 12 pages.

Office Action for U.S. Appl. No. 11/073,038, mail date Aug. 19, 2009, 13 pages.

Office Action for U.S. Appl. No. 11/073,038, mail date Feb. 13, 2009, 12 pages.

Office Action for U.S. Appl. No. 11/073,038, mail date Jul. 10, 2008, 8 pages.

Office Action for U.S. Appl. No. 11/074,367, mail date Dec. 2, 2008, 11 pages.

Office Action for U.S. Appl. No. 11/074,367, mail date Jun. 23, 2008, 16 pages.

Office Action for U.S. Appl. No. 11/074,367, mail date Jun. 9, 2009, 15 pages.

Office Action for U.S. Appl. No. 11/074,367, mail date Sep. 6, 2007, 11 pages.

* cited by examiner

| Box | No. Item | | Origin | Article (Variant, lot) | Latest PO date | Vendor | Delivery Date GR Ramp | Price | Quantity | UoM | Site |
|---|---|---|---|---|---|---|---|---|---|---|---|
| ☐ | 12345678 | 10 | EKL | 471100 | 13/09/2002 | 100006 | 01/03/2003 | 1000 | 100 | CAR | VZ01 |
| ☐ | 12345678 | 20 | EKL | 4712200 | 20/09/2002 | 200003 | 15/03/2003 | 500 | 10 | CAR | VZ01 |
| ☐ | 12345678 | 30 | EKL | 4713001 | 23/09/2002 | 100006 | 20/03/2003 | 69 | 1 | PC | VZ01 |
| ☐ | 12345678 | 40 | EKL | 4713002 | 23/09/2002 | 100006 | 20/03/2003 | 69 | 1 | PC | VZ01 |
| ☐ | 12345678 | 50 | EKL | 4713003 | 23/09/2002 | 100006 | 20/03/2003 | 69 | 1 | PC | VZ01 |
| ☐ | 98765432 | 10 | EKL | 4714001 | 23/09/2002 | 200004 | 30/09/2003 | 89 | 1 | PC | VZ01 |
| ☐ | 98765432 | 20 | EKL | 4714002 | 25/09/2002 | 200004 | 30/09/2003 | 89 | 1 | PC | VZ01 |
| ☐ | 98765432 | 30 | EKL | 4714003 | 25/09/2002 | 200004 | 30/09/2003 | 89 | 1 | PC | VZ01 |
| ☐ | 98765432 | 40 | EKL | 4714004 | 25/09/2002 | 200004 | 30/09/2003 | 89 | 1 | PC | VZ01 |
| ☐ | 98765432 | 50 | EKL | 4714005 | 25/09/2002 | 200004 | 30/09/2003 | 89 | 1 | PC | VZ01 |
| ☐ | S0000001 | 10 | ADH | 471500 | 23/09/2002 | 100006 | 25/06/2003 | 10 | 25 | CAR | VZ01 |
| ☐ | S0000001 | 10 | ADH | 471600 | 23/09/2002 | 100006 | 23/04/2003 | 20 | 80 | CAR | VZ01 |
| ☐ | S0000002 | 20 | ADH | 480000 | 20/10/2002 | 100006 | 23/04/2003 | 30 | 20 | PC | VZ01 |
| ☐ | S0000003 | 10 | ADH | 491200 | 20/10/2002 | 100006 | 23/04/2003 | 10 | 120 | CAR | VZ01 |

FIG. 6

PO Manager

| | | | |
|---|---|---|---|
| Purch. Organization | | to | |
| Purchasing group | | to | |
| *Latest PO Date* | | to | |
| *Delivery date* | | to | |
| Vendor | | to | |
| Material | | to | |
| Plant | | to | |
| Plant cat. | | to | |
| *Firm Deal* | | to | |
| *Release Indicator* | | to | |
| Order type | | to | |

☑ MYDOC
☑ Order List Entries
☐ Grouped PO Documents
☐ Purchase Orders

FIG. 8

SYSTEM AND METHOD FOR PLANNING, ALLOCATION, AND PURCHASING

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of systems and methods for managing procurement and distribution of goods. More particularly, the present description relates to a system and method configured to manage aspects of planning, allocation, and purchasing of goods.

Providers of retail sales articles and services seek to provide the right product, at the right place, at the right time. These articles often have a short life cycle, particularly with regard to sales of retail fashion articles, and new articles have to be presented quite frequently. At the same time, the consumers demand a wide assortment variety for the goods that are presented. Accordingly, large numbers of different fashion articles often have to be planned for, purchased, and allocated among sales locations within extremely short time frames.

Further, tracking inventory and budgets for articles and services can be important to the profitability of a business. For example, identifying a particularly fast selling item and ordering additional quantities to arrive on time and within a prescribed budget may increase the profitability of a retail location. Accordingly, it is important for a business to carefully plan and schedule purchasing orders for retail sales articles and services to ensure on-time procurement or scheduling within budget constraints. Optimizing the smooth flow of the procurement process increases an enterprise's efficiency and competitiveness and determines its success.

Yet further, the goods delivered for these orders may be delivered for all locations and then allocated among the several possible locations to further increase profitability. For example, one location may be experiencing a higher demand for a particular good. Accordingly, more of that good should be allocated to the high demand location.

In view of the foregoing, it would be beneficial to provide system configured to manage planning, purchasing, and allocating aspects of inventory management. It would further be beneficial to provide such a system configured to automatically perform planning, purchasing, and allocating functions within defined limits. It would be further beneficial to provide such a system wherein aspects of automated planning, purchasing, and/or planning are integrated with automated aspects of the others of planning, purchasing, and/or planning.

SUMMARY

According to an exemplary embodiment, a method of integrating planning, purchasing, and allocation of goods in a computerized system is disclosed. The method includes providing a purchase order workbench for generating a purchase order list based on received purchasing data. The purchase order list includes a plurality of items and associated purchasing data for each item. The method further includes providing a planning workbench for applying one or more budget rules to the plurality of items in the purchase order list to determine whether the purchase of the items in the purchase order list should be approved based on the application of the one or more budget rules, providing an allocation workbench for generating an allocation table. The allocation table includes at least one of the plurality of items from the purchase order list that has been approved for purchase and a designation of a sales location for each item. The method yet further includes providing a system interface configured to access the purchase order, planning, and allocation workbenches.

According to another exemplary embodiment, a computerized system for integrating planning, purchasing, and allocation of goods. The system includes purchase order workbench means for providing a purchase order workbench for generating a purchase order list based on received purchasing data. The purchase order list includes a plurality of items and associated purchasing data for each item. The system further includes a planning workbench means for providing a planning workbench for applying one or more budget rules to the plurality of items in the purchase order list to determine whether the purchase of the items in the purchase order list should be approved based on the application of the one or more budget rules. The system yet further includes an allocation workbench means for providing an allocation workbench for generating an allocation table. The allocation table includes at least one of the plurality of items from the purchase order list that has been approved for purchase and a designation of a sales location for each item. The system yet further includes a system interface means for providing a system interface configured to access the purchase order, planning, and allocation workbenches.

According to another exemplary embodiment, a program product for integrating planning, purchasing, and allocation of goods is disclosed. The program product includes machine-readable program code for causing, when executed, one or more machines to perform method steps. The method steps include providing a purchase order workbench for generating a purchase order list based on received purchasing data, the purchase order list including a plurality of items and associated purchasing data for each item. The steps further include providing a planning workbench for applying one or more budget rules to the plurality of items in the purchase order list to determine whether the purchase of the items in the purchase order list should be approved based on the application of the one or more budget rules. The steps yet further include providing an allocation workbench for generating an allocation table, the allocation table including at least one of the plurality of items from the purchase order list that has been approved for purchase, the allocation table including a designation of a sales location for each item, and providing a system interface configured to access the purchase order, planning, and allocation workbenches.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 6 illustrates the structure of a purchase order list, according to an exemplary embodiment;

FIG. 8 illustrates the structure of a selection screen, according to another exemplary embodiment;

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

Figure 1:
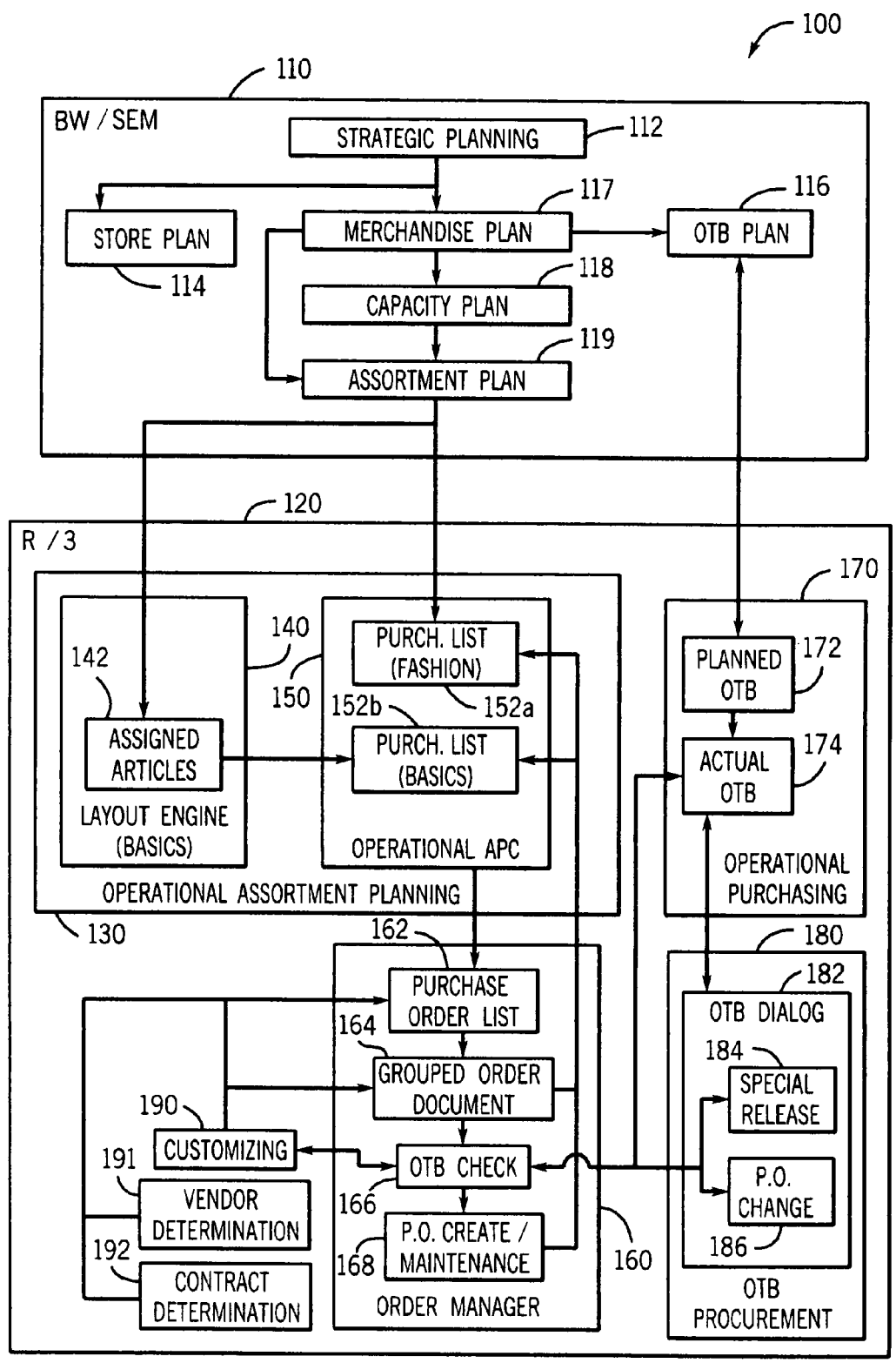
FIG. 1 is a data flow diagram illustrating a system for facilitating planning and procurement of retail sales articles and services, according to an exemplary embodiment.

FIG. 1 illustrates a system 100 for facilitating planning, purchasing, and allocation of retail sales articles and services, according to an exemplary embodiment. System 100 is illustrated as including a back end system 110 (identified as "BW/SEM") and a front end system 120 (identified as "R/3"). According to an alternative embodiment, a single integrated system may be used in place of back end system 110 and front end system 120. System 100 may be implemented as a single system, a distributed system, or any combination thereof. System 100 may be implemented using a single computing system, a plurality of computing systems, software, hardware, or any other system or combination of systems to perform the functions described herein.

In operation, system 100 may be used, for example, to implement a planning document or purchase order list by generating and managing purchase orders for retail sales articles and services and allocating the retail sales articles and services among any of several locations. Implementation of the planning document may include automated determination of a pre-existing supplier contract for a particular article or group of articles to be procured.

Back end system 110 may be a data repository configured to receive, sort, process, and store retail sales data, as well as to facilitate planning, provide reporting, and provide other functions associated with managing sales data using one or more functions and/or components. For example, in the illustrated embodiment, back end system 110 includes a strategic planning function 112. Strategic planning function 112 may be used to facilitate an overall business financial plan which defines the retailer's financial goals (e.g., revenues, gross margins, etc.), planned expenses (e.g., inventory, marketing, etc.), and budgets. Accordingly, strategic planning function 112 may be used to generate a store plan 114, an "Open To Buy" (OTB) plan 116, a merchandise plan 117, a capacity plan 118, and an assortment plan 119. According to other exemplary embodiments, back end system 110 may include additional, fewer, and/or different functions.

Store plan 114 may be a plan in which revenues and costs are based on factors within a store hierarchy such as regional marketing, competition, demographic shifts and preferences, and events. OTB plan 116 is derived from merchandise plan 117 and may be a plan designed to maximize turnover potential and minimize capital investment and stockholding costs. OTB planning data may include, for example, an extrapolated amount of available budget for procuring a retail sales article. Merchandise plan 117 may define target purchasing, sales, margin, and inventory levels that are consistent with the overall business plan. Capacity plan 118 is derived from merchandise plan 117 and may be a plan which takes into account the available shelf and/or floor space in a particular store or group of stores in order to determine an optimal number of certain types of retail sales articles to be procured for the store or group of stores.

Assortment plan 119 is based on merchandise plan 117 (and optionally on capacity plan 118 for certain articles) and may be a plan which defines ranges of retail sales articles (e.g., colors and sizes) that may be assigned to a particular grouping of stores. Assortment plan 119 may form the basis for selecting, procuring, and allocating quantities of particular retail sales articles. For example, in the illustrated embodiment, assortment planning data from assortment plan 119 is provided to front-end system 120 in order to facilitate generation and management of purchase orders for the associated retail sales articles.

Front end system 120 is communicatively coupled to back end system 110 and is similarly configured to receive, sort, process, and store retail sales data, as well as to facilitate planning, provide reporting, and provide other functions associated with managing sales data using one or more functions and/or components and in conjunction with back end system 110. For example, in the illustrated embodiment, front end system 120 includes operational assortment planning system 130, order manager system 160, operational purchasing system 170, and OTB procurement system 180. According to other exemplary embodiments, front-end system 120 may include additional, fewer, and/or different functions.

Operational assortment planning system 130 is configured to receive strategic planning data, such as merchandise plan data 117, capacity plan data 118, and assortment planning data 119, from back end system 110, to facilitate refinement and/or addition of detail to the strategic planning data (e.g., specific retail sales articles and quantities to be procured for specific stores during specific periods), and to distribute the data to other downstream processes. In the illustrated embodiment, operational assortment planning system 130 includes a layout engine 140 and an operative assortment planning and control (APC) engine 150. Data from layout engine 140 is passed on to APC engine 150 where it is processed and distributed to downstream processes.

Layout engine 140 is configured to receive strategic planning data from back end system 110, such as capacity data 118 and assortment planning data 119, and to use this data to assign, for example, certain types of retail sales articles to specific locations or layouts according to the available capacity in a store or group of stores. For example, in the illustrated embodiment, layout engine 140 may be used to assign basic, repeat, or "stackable" retail sales articles to a particular layout according to available capacities. In other embodiments, layout engine 140 may be used in conjunction with other types of retail sales articles. Layout data, such as assignments 142 of specific retail sales articles to a particular layout is then passed on to APC engine 150.

APC engine 150 is configured to receive strategic planning data from back end system 110 via an inbound interface, and/or assigned article data 142 from layout engine 140, and to determine groupings and quantities of specific retail sales articles that are to be procured during a specific period and delivered to a specific store or group of stores. By way of example, the following strategic planning data may be "pushed" (or written) or "pulled" (or read) by APC engine 150:

(i) Key performance indicator "fixed initial stock-up" (on a quantity and value basis: purchase price, sales price) at various levels (e.g., article hierarchy node, season/season year, rollout, global assortments assigned to the hierarchy node) Fixed initial stock-up represents fixed quantities of new merchandise to be procured from a capacity standpoint.

(ii) Key performance indicator "variable initial stock-up" on a quantity and value basis at the same levels. Variable initial stock-up represents quantities of new merchandise to be procured from a sales standpoint (e.g., forecast sales).

(iii) Key performance indicator "putaway quantity" on a quantity and value basis at various levels (e.g., article hierarchy node, season/season year, rollout, distribution center). Putaway quantity represents quantities of an article that are not to be shipped directly to a store, but rather are to be shipped to a distribution center first.

(iv) The number of different generic articles (or single articles) per key performance indicator in the assortments (assortment breadth).

APC engine 150 uses the strategic planning data received from back end system 110 and/or assigned article data 142 received from layout engine 140 to generate output data including planned assortments/store groups that, upon release, are pushed to downstream processes. Output data from APC engine 150 may also include one or more purchasing lists 152 of various types. For example, in the illustrated embodiment, APC engine 150 uses strategic planning data received from back end system 110 to generate one or more purchasing lists 152a for fashion retail sales articles, and uses assigned article data 142 from layout engine 140 to generate one or more purchasing lists 152b for non-fashion retail sales articles such as basics or stackable merchandise.

Purchasing list 152 is a list of retail sales articles and corresponding planned purchasing quantities for selected planning levels (e.g., article hierarchy node/season, season year/rollout/assortment type) in APC engine 150. Each purchasing list 152 includes one or more purchasing list items, which represent the smallest possible unit in each purchasing list. A purchasing list item may include a generic article, variants of the generic article (e.g., color or size ranges), or single articles. A purchasing list item may also include planned quantities that are planned within a purchasing list for a specific store delivery date for the various global assortments and key performance indicators. By way of example, each purchasing list item may include the following information:

(i) Purchasing list item number or identifier. This number allows communication between APC engine 150 and the various operative applications;

(ii) Article number or identifier;

(iii) Characteristic 1 (e.g., "article number-characteristic level"). A data retention level of this type allows APC engine 150 to save confirmed order quantities at the characteristic level and facilitates confirmation as to whether the order quantities for a certain characteristic value deviate from the planned quantities;

(iii) Market buying number. This number allows tracking of specific generic articles that may be moved from one purchasing list to another;

(iv) Prices (e.g., purchase price and sales price);

(v) Currencies (e.g., local currency, vendor currency);

(vi) "Price fixed" indicator. This indicator ensures that price determination is not performed for either the purchase or sales price during order processing;

(vii) Total purchase order quantity for articles—planned and actual quantities (for confirmations from the purchase order) and article/characteristic value;

(viii) Vendor. Where a vendor is not maintained by APC engine 150, the vendor may be determined from the purchase order list, as will be described below;

(ix) Supplying site (e.g., distribution center, location for delivery);

(x) Dates (e.g., store delivery date, distribution center delivery date, latest possible order date), planned and actual dates;

(xi) Fields for confirmations (e.g., confirmations from downstream processes); and (xii) Status fields for the purchasing list item (e.g., status information from downstream processes).

Order manager system 160 is configured to receive data from APC engine 150 in the form of released purchasing list items, and to generate a corresponding purchase order list 162. Items in purchase order list 162 for which a purchase order is to be generated are transferred to a grouped procurement document 164. In one embodiment, items in purchase order list 162 for which a purchase order is to be generated may be grouped together for transfer to grouped procurement document 164 according to selected criteria (e.g., by using a graphical user interface). Grouping criteria for creating and changing purchase orders may include grouping based on, for example, a delivery period, a delivery date, a contract, an OTB budget, a purchasing group, a plant or location, an item category, etc. According to an exemplary embodiment, these criteria may be modified or enhanced by a user of system 100.

Items may also be revised if necessary after transfer to a grouped procurement document 164. For example, in one embodiment, vendor determination function 191 and contract determination function 192 may be carried out for items in grouped procurement document 164 if these functions were not performed for purchase order list 162. Once an item has been transferred to the grouped procurement document 164, a confirmation is sent to APC engine 150 (e.g., as a status field for the corresponding purchasing list item) and the item is identified for removal from purchase order list 162 by setting a deletion indicator in the purchased list. Items identified for removal from purchase order list 162 remain, however, in purchasing list 152. Items transferred to grouped procurement document 164 may be returned to purchase order list 162 by removing the deletion indicator and sending another confirmation to APC engine 150. All items in purchase order list 162 that remain marked for deletion are deleted upon generation of a purchase order 168 from grouped procurement document 164.

Once grouped order document 164 has been prepared, order manager 160 performs an OTB check 166 to verify that budgeted funds are available such that a purchase order may be generated. If OTB check 166 is successful, a confirmation may be sent to APC engine 150 (e.g., as a status field for the corresponding purchasing list item) and order manager system 160 may then generate a purchase order 168. If OTB check 166 is not successful, a failure message may be sent to APC engine 150 (e.g., as a status field for the corresponding purchasing list item). The grouped purchase order document may then need to be modified and/or specially authorized such that a purchase order may be generated.

Operational purchasing system 170 is configured to perform OTB check 166 in conjunction with order manager system 160. Operational purchasing system 170 includes planned OTB data 172 and actual OTB data 174. Planned OTB data may include OTB plan data 116 received by operational purchasing system 170 from back end system 110. Operational purchasing system 170 uses planned OTB data 172 and actual OTB data 174 to determine whether budgeted funds are available such that a purchase order may be generated for a particular grouped order document 164.

Figure 2:
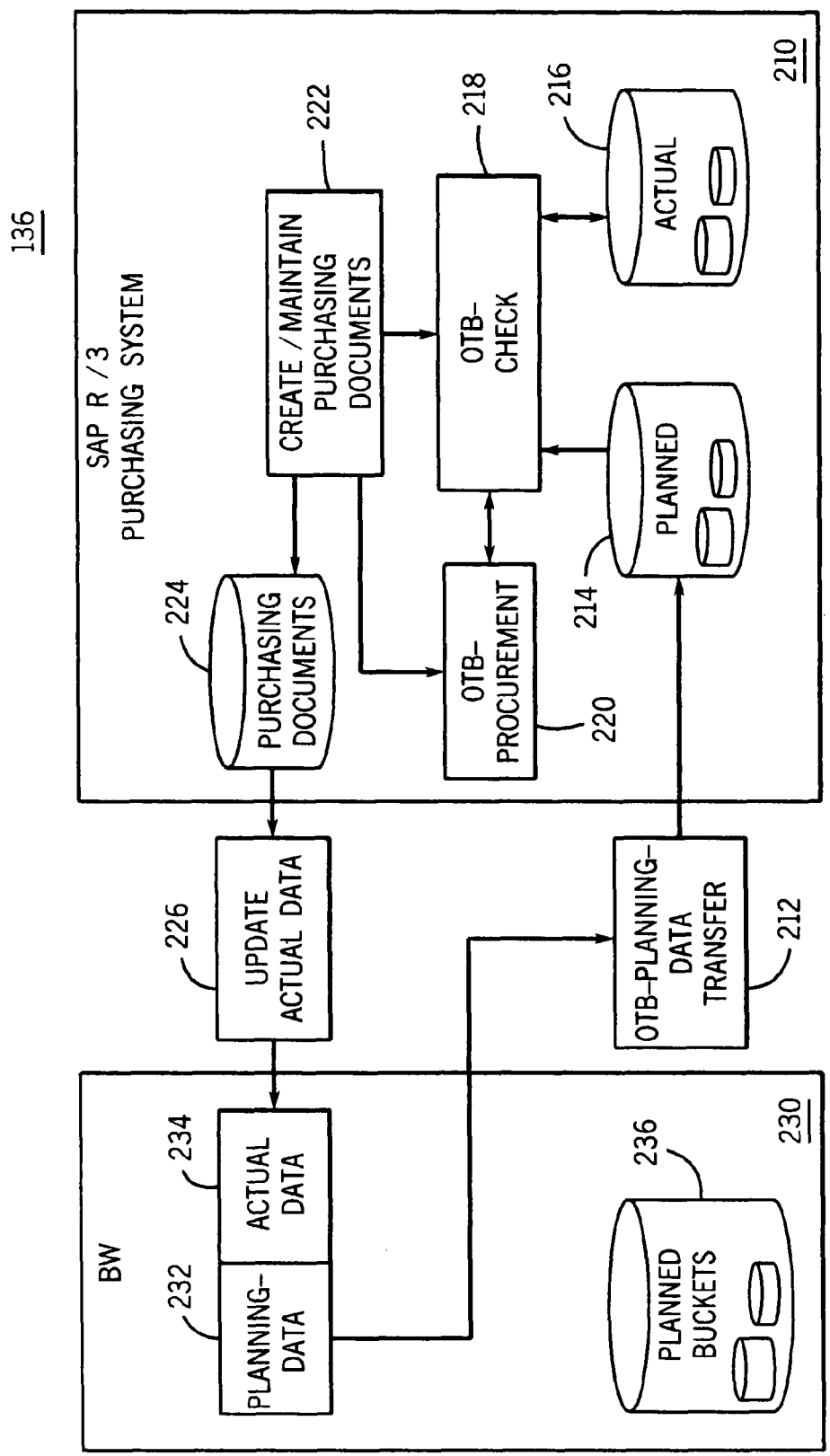
FIG. 2 is a block diagram illustrating an open to buy control system, according to an exemplary embodiment.

Referring now to FIG. 2, a block diagram illustrates operational purchasing system 170, according to an exemplary embodiment. Operational purchasing system 170 includes a plurality of components configured to implement one or more functions to facilitate acceptance or rejection of an electronic purchase order.

Operational purchasing system 170 includes a front-end system 210 configured to provide an interface between one or more users and a back-end system 230, according to an exemplary embodiment. Although shown as separate components, front-end system 210 and back-end system 230 may alternatively be implemented as a single system. Yet further, operational purchasing system 170 may include a plurality of either front-end systems 210 or back-end systems 230. For example, operational purchasing system 170 may include a plurality of front-end systems 210 to allow multiple users in distributed locations to access uniform and synchronized information stored on backend system 230. According to an exemplary embodiment, front end system 210 and backend system 230 may be the same as front end system 120 and backend system 110.

Further, each of the front-end system 210 and the back-end system 230 may further be configured to each include lower-level front-end and back-end systems. In this regard, one or both of the front-end system 210 and the back-end system 230 may include components which allow user interaction and components which interface with other modules.

Front-end system 210 is configured to allow one or more users to perform a functions implemented using operational purchasing system 170. In the illustrated exemplary embodiment, the front-end system 210 includes a planning-data transfer module 212 adapted to receive data from the back-end system 230. The data received may include, for example, planned budget buckets, sales and budgeting information based on prior experience, current market conditions, and other factors. Additional detail relating to the planning data and its generation is provided below with reference to the description of the back-end system 230.

The planning-data transfer module 212 may generate a budget or a set of budget buckets, or budget portions, based on the planning data received from the back-end system 230. The budget information generated can then be stored in a planned budget module 214 as planned OTB 172, described above with reference to FIG. 1. In other embodiments, the planning-data transfer module 212 may receive and transfer raw planning data, and the planned budget module 214 may generated the budget information. In still further embodiments, the budget information may be generated within the back-end system 230 and forwarded to the planned budget module 214 through the planning data transfer module 212.

When a purchase order is received or submitted for processing, the front-end system 210 applies a set of checks or rules to determine whether the order should be processed as submitted. In this regard, the front-end system 210 is provided with an order check module 218. The order check module 218 accesses budget information from the planned budget module 214 to perform the necessary checks.

The order check module 218 may be configured to apply one or more open to buy rules to an electronic purchase order to determine whether the electronic purchase order should be accepted or rejected. A budget rule may be a type of open to buy rule. The order check module 218 may include a currency translation function configured to convert generic financial information to specific financial information relevant to the current user of front-end system 210. Status processing function 218 may be any function configured to determine whether no check was performed, a positive check result was received or a negative check result was received.

If the order check module 218 determines that the purchase order can be processed, the order is forwarded to a procurement module 220, which may communicate, directly or indirectly, with a computer at a supplier or a vendor to place the order. The procurement module 220 may be configured to receive and process information related to the creation, modification, or cancellation of an electronic purchase order.

If, on the other hand, the order check module 218 determines that the rules do not allow the purchase order to be processed as submitted, the order, the rules, the budget or a combination thereof may be modified to allow the processing of the purchase order. The front-end system 210 may be provided with an actual budget module 216 to store budget information which may have been updated or revised by the order check module 218.

Once the order has been placed by the procurement module 220, a confirmation may be received from the supplier or vendor. The information relating to the placement of the order may be generated by a purchasing documents creation module 222. In this regard, the information may include any revisions to the purchase order required by the order check module 218. The information generated by the purchasing documents creation module 222 may then be stored in a purchasing documents data store 224. In certain embodiments, an actual data transfer module 226 may be provided to supply the actual order and budget information to the back-end system for planning purposes.

According to alternative embodiments, front-end system 210 may include more, fewer, and/or different functions to provide a user interface and perform calculations related to purchase order processing. The described functions may be implemented using hardware, software, integrated circuits or any system configured to perform the functions described herein.

Back-end system 230 is configured to process data, store data, facilitate planning, provide reporting, and provide other functions associated with purchase order management using one or more functions and/or components. The back-end system 230 includes a planning data module 232 adapted to generate a merchandise ordering plan including all planned data e.g. planned sales, planned margin, planned inventory, planned receipts and planned budget buckets. The merchandise ordering plan may include information relevant to, for example, order scheduling and budgeting. The planning data module 232 may be configured to receive information from at least an order forecasting system and an actual inventory reporting system 234. The order forecasting system (not shown) may include information from various sources, such as industry outlook reports, relating to expected market conditions, for example. The actual inventory reporting system 234 provides information to the planning data module 232 relevant to the actual inventory currently available, which may include expected deliveries. In this regard, the actual inventory reporting system 234 may include information received from the front-end system 210, through the actual data transfer module 226, relating to purchase orders already placed.

In certain embodiments, the planning data module 232 may be adapted to generate budget information. The budget information may be stored within the back-end system 230 in a transferred budget module 236. Transferred budget module 236 may be used to store planned budget buckets that have been released and or transferred to planned budget module 214 or the transferred budget module. This may be used to reduce data traffic that only the changed and new buckets are transferred from planning data module 232 and Transferred budget module 236 to planned budget module 214.

As noted above, the generation of the budget information from the planning information may be accomplished by either the planning-data module 232, the planning data transfer module 212 or the planned budget modules 214, 236. In this regard, the budget information may include a budget allocation into a plurality of budget portions, or buckets, each corresponding to, for example, a delivery period, an order period, a merchandise category or a combination thereof.

According to alternative embodiments, backend system 230 may include more, fewer, and/or different functions to provide information and perform calculations related to purchase order processing.

Calculate open to buy rule transferred budget module 236 may be a function configured to generate one or more rules or functions to be applied to an electronic purchase order to determine whether the electronic purchase order should be accepted or rejected.

Front-end system 210 and backend system 230 may be associated with one or more interface calls. An interface call is a message sent between front-end system 210 and back end system 230 or within either system. The interface call may be a request for information, a request for processing, and/or a communication of data. Each interface call may be associated with one or more functions or components within operational purchasing system 170.

A purchase order processing interface call is a communication from front-end system 210 to back-end system 230 communicating a request for the creation, modification, and/ or cancellation of a purchase order. Modifications may include changes to amounts, changes to timing information, or any other modification. Based upon receipt of an interface call, the back-end system 230 is configured to create, modify, and/or cancel a purchase order.

A calculate open to buy rule interface call is a communication from back-end system 230 to front-end system 210 including an open to buy rule to be applied to electronic purchase orders. Based upon receipt of the open to buy rule, the front-end system 210 may be configured to store the open to buy rule for application to future electronic purchase order requests in, for example, the order check module 218, which may further be configured to perform a validation check on the open to buy rule upon receipt as further described below with reference to FIG. 3.

An open to buy interface call is a communication from planned budget module 214 to order check module 218 within the back-end system 230 including planning information to be used in the generation of open to buy rules. The budget planning information may include at least planned receipts, pending purchase orders, open purchase orders, order forecasts, receipts, and the change in end of planning period inventory. The interface call may further include a transfer from the order check module 218 to the used budget module 216. The transferred information may include used budget information according to existing purchase orders.

Referring again to FIG. 1, OTB procurement system 180, including OTB procurement module 220, described above with reference to FIG. 2, is in communication with order manager system 160 and operational purchasing system 170 and is configured to provide options for successfully generating a purchase order for grouped procurement document 164 when OTB check 166 is not successful. For example, in the illustrated embodiment, OTB procurement system 180 includes OTB dialog 182, which provides options to either initiate a special release 184 or a purchase order change 186. When special release 184 is initiated, grouped procurement document 164 is forwarded to, for example, an appropriately authorized individual for approval. When purchase order change 186 is initiated, grouped procurement document 164 may be modified. Such modifications may include changes in quantities, changes in delivery dates, changes in price, etc.

Figure 3:
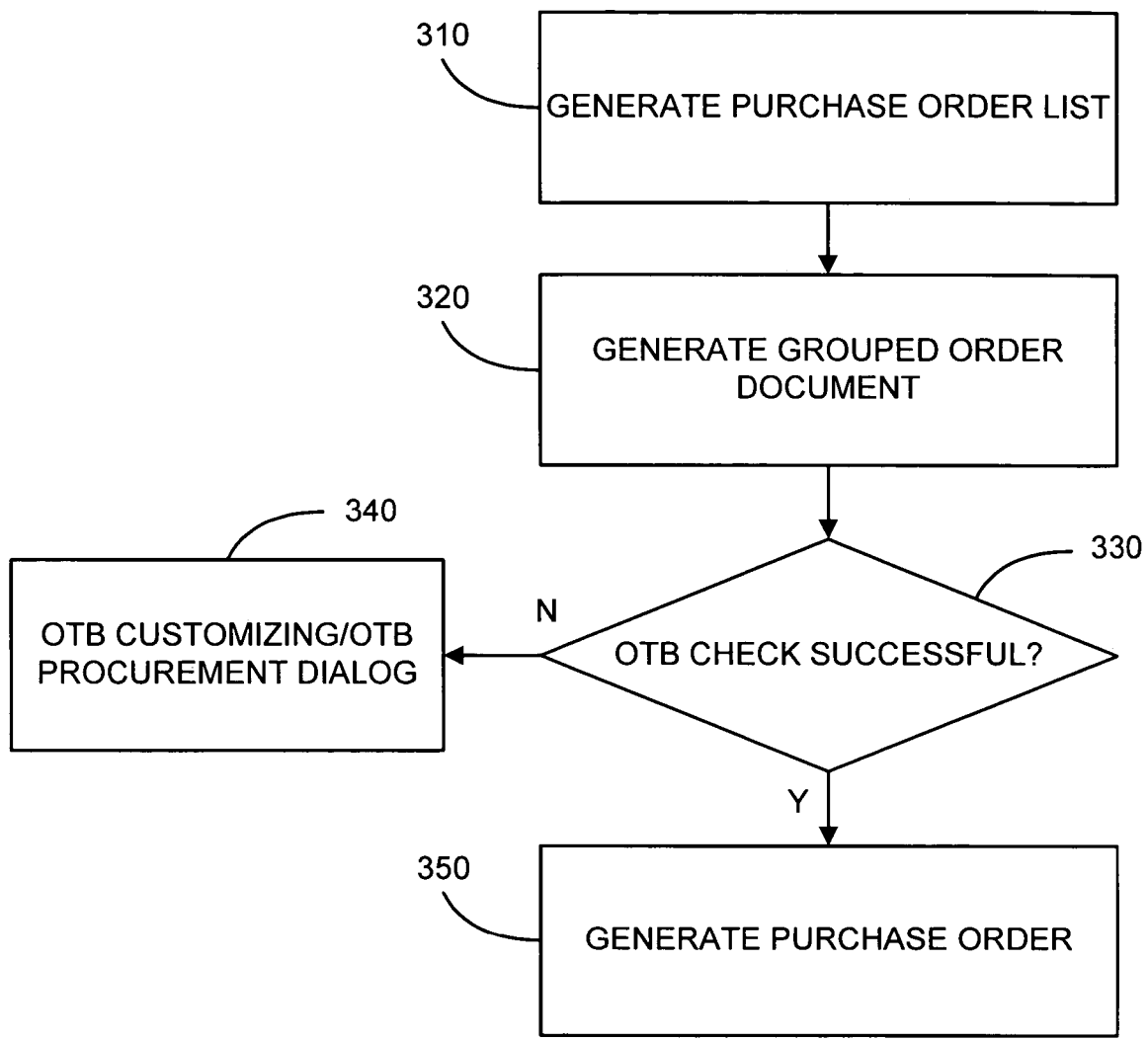
FIG. 3 is a flow diagram illustrating a method of using a purchase order list to generate a purchase order, according to an exemplary embodiment.

FIG. 3 illustrates a method of using a purchase order list to generate a purchase order according to an exemplary embodiment. The process begins with a step 310. In step 310, released purchasing list items are received and a purchase order list is generated which includes a corresponding line item for each released purchasing list item. In a step 320, particular items in the purchase order list for which a purchase order is to be generated are transferred to a grouped procurement document. In a step 330, an OTB check is performed on the grouped procurement document to verify that sufficient budget is available for a purchase order to be generated. If the OTB check is not successful, the process continues with a step 340. If the OTB check is successful, the process continues with a step 350. In step 340, the grouped procurement document may be subject to modification or special approval. For example, the grouped procurement document may be subject to approval via a special release as described above, or may be subject to modifications. In one embodiment, such modifications may include changes in quantities, changes in delivery dates, changes in price, etc. In step 350, a purchase order is generated for items in the grouped procurement document.

Figure 4:
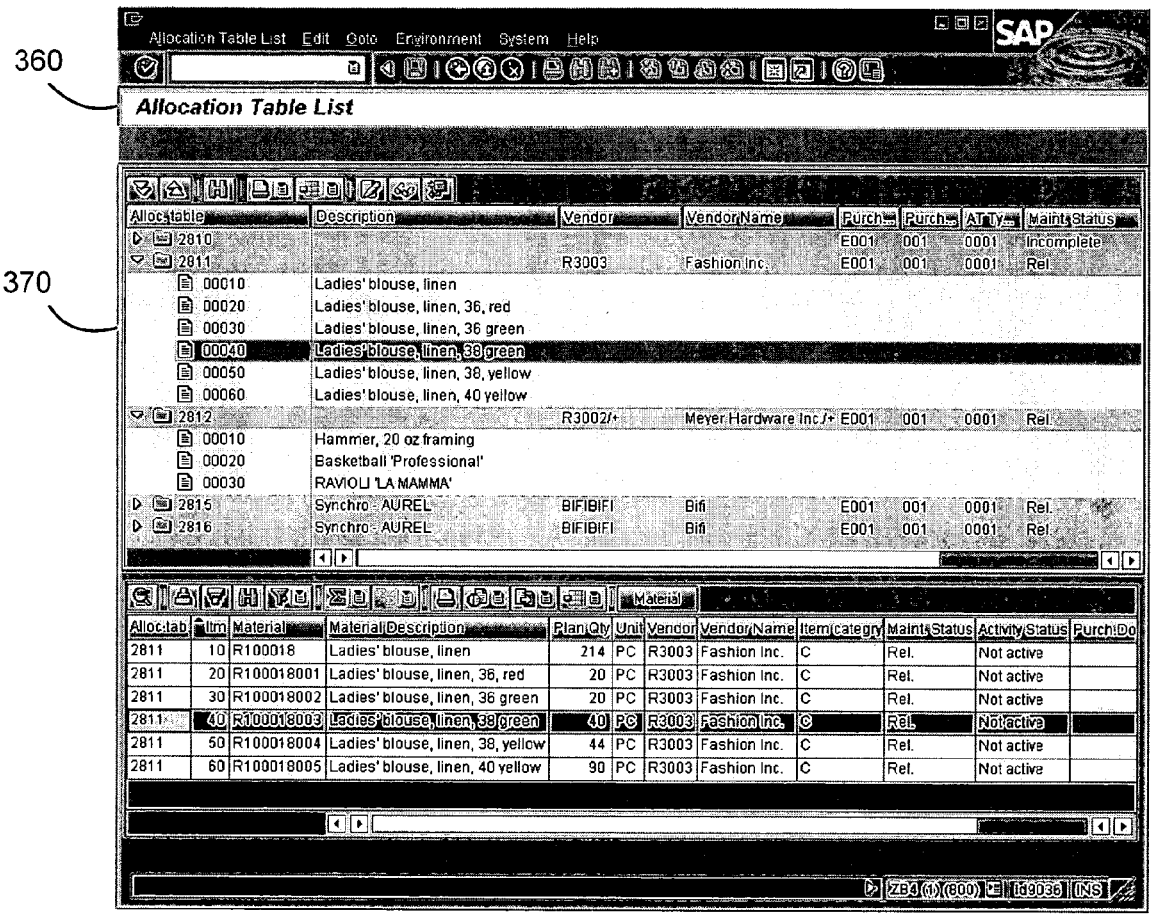
FIG. 4 is an allocation table illustrating items to be allocated among different sales locations, according to an exemplary embodiment.

Referring now to FIG. 4, an allocation table 360 for purchase orders that have successfully per-formed the OTB check, described above with reference to FIG. 3, is shown, according to an exemplary embodiment. The allocation table is a planning tool implemented using an allocation system used to allocate inventories of stock or items among sales locations during specific periods. The allocation system allows a user to plan, trigger, and monitor goods supplied to recipients (for example, stores or customers). Thus, allocation tables are primarily used to distribute goods or articles (referred to as allocation table items) to recipients. The allocation table may including a listing of items 370 in which the total quantity of a material to be allocated is defined.

Although described above as being created based on a successful OTB check, allocation table 360 may alternatively be created based on an ad hoc purchase without operation assortment planning and control, or according to any other method or event. Further, allocation table 360 may be functionally linked to operational assortment planning 140 and order manager 160, such that changes to allocation table 360 and/or changes to underlying planning documents, such as purchasing list 152, or changes to purchase orders, will automatically be propagated throughout system 100. The automatic propagation may further trigger other events or processes, such as OTB check 166.

Allocation table 360 may further be linked to backend system 110 to receive real time and/or near real time data from the sales location such that deviations from planned data, may automatically be recognized and acted upon. For example, a particular location may be allocated a first quantity of a particular item, but, for any of a variety of reasons, be facing a particularly high demand for that particular item. The high demand will be reflected in a higher number of sales than projected that is reported to back end system 110. Based on this demand, a determination can be made whether to increase the allocation of the particular item to the location. If the chance is warranted, allocation table 360 may be modified. Based on this modification, one or more additional events, such a generation of a new purchasing order, decreasing the allocation for a slow-selling location, etc. may also occur. This process may be automated to any degree desired.

Referring again to FIG. 1, order manager system 160 may also be configured to determine a suitable source or vendor, including selecting a relevant existing purchasing contract, for an item in purchase order list 162 as mentioned above. For example, order manager system 160 may utilize a vendor determination function 191 in order to automatically determine a suitable vendor for an item in purchase order list 162, such as items in purchase order list 162 for which relevant vendor data was not transferred from APC engine 150. Vendor determination function 191 may include a specific procedure for uniquely identifying a particular vendor (which the user may optionally designate as a preferred vendor) for an item in purchasing list 162. According to an exemplary embodiment, if vendor determination function 191 is unable to identify a unique vendor for a particular item in purchase order list 162, the user is presented with a list from which a relevant vendor for the item may be selected manually.

Order manager system 160 may also utilize a contract determination function 192 in order to determine and assign a reference or link to a relevant existing purchasing contract with the identified vendor (e.g., a vendor identified based on vendor data from APC engine 150 or by vendor determination function 191) for an item in purchase order list 162. According to an exemplary embodiment, order manager system 160 may also be configured to use contract determination function 192 to determine and assign a reference or link to a relevant existing purchasing contract for ad-hoc items or other items in purchase order list 162 for which a vendor was manually specified by a user.

Figure 5:
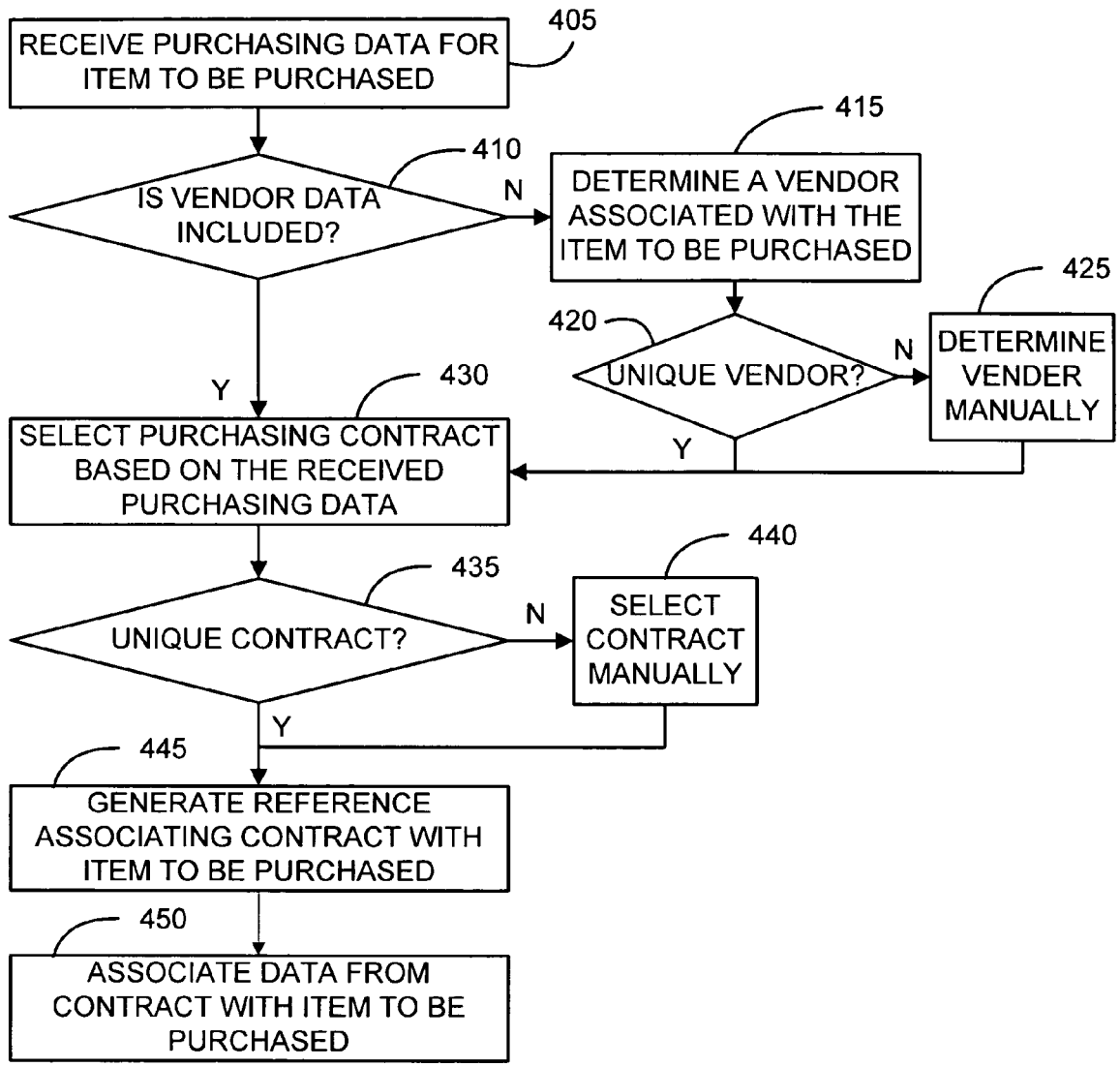
FIG. 5 is a flow diagram illustrating a method of associating a purchasing contract with an item to be purchased, according to an exemplary embodiment.

As with source determination function 191, contract determination function 192 may include specific procedures for identifying a unique contract for an item in purchase order list 162. For example, in one embodiment, contract determination function 192 may be configured to utilize the oldest existing contract where there are multiple existing purchasing contracts which may be relevant to a particular item in purchase order list 162. If contract determination function 192 is able to identify a unique purchasing contract, a reference associating the purchasing contract with the item in purchase order list 162 may be generated, and the purchase price specified in the contract may be transferred from the contract to the item in purchase order list 162. According to an exemplary embodiment, the purchase price or other data specified in the purchasing contract is used automatically unless the purchase price field in purchase order list 162 cannot be manually or otherwise edited as indicated to the user by, for example highlighting or gray shading as shown in FIG. 5. Where contract determination function 192 is unable to uniquely identify a unique purchasing contract for a particular item in purchase order list 162, a contract may be identified manually. According to an exemplary embodiment, for example, if contract determination function 192 is unable to identify a unique purchasing contract for a particular item in purchase order list 162, the user is presented with a list from which a relevant existing purchasing contract may be selected manually.

According to an exemplary embodiment, a user may activate or deactivate contract determination function 192 in order manager system 160 based on a customized setting in customizing engine 190. For example, in one embodiment, customizing engine 190 may include a purchase order handling setting which may be set to "ON" in order to activate contract determination function 192, and to "OFF" in order to deactivate contract determination function 192.

FIG. 5 illustrates a process of associating a purchasing contract with an item to be purchased according to an exemplary embodiment. The process begins with a step 405. In step 405 purchasing data is received for an item to be purchased. The purchasing data may be received from, for example, APC engine 150 (shown in FIG. 1), or from an ad-hoc item entry. In a step 410, if vendor data for the item to be purchased is included in the received purchasing data, the process continues with step a 430. If vendor data is not received, the process continues with a step 415.

In step 415, a vender associated with the item to be purchased is determined. According to an exemplary embodiment, the vender associated with the item to be purchased is automatically determined using vendor determination function 191 (shown in FIG. 1). In a step 420, if a unique vendor is determined, the process continues with step 430. If a unique vendor is not determined (e.g., multiple vendors exist or no vendor is identified), then the process continues with a step 425. In step 425, a vendor for the item to be purchased is determined manually. According to an exemplary embodiment, a vendor for the item to be purchased is determined manually by a user from a list of possible vendors for the item to be purchased. Once a vendor has been manually determined, the process continues with step 430.

In step 430, a purchasing contract is selected for the item to be purchased based on the received purchasing data. According to an exemplary embodiment, the purchasing contract associated with the item to be purchased is automatically selected using contract determination function 192 (shown in FIG. 1). In a step 435, if a unique purchasing contract is determined, the process continues with a step 445. If a unique purchasing contract is not determined (e.g., multiple purchasing contracts exist or no purchasing contract is identified), then the process continues with a step 440. In step 440, a purchasing contract for the item to be purchased is selected manually. According to an exemplary embodiment, a purchasing contract for the item to be purchased is selected manually by a user from a list of possible purchasing contracts for the item to be purchased. Once a vendor has been manually selected, the process continues with step 445.

In step 445, a reference associating the selected purchasing contract with the item to be purchased is generated. In a step 450, data from the selected purchasing contract may be associated with the item to be purchased. For example, according to an exemplary embodiment, the purchase price specified in the purchasing contract may be transferred from the purchasing contract to the item to be purchased in purchase order list 162 (shown in FIG. 1).

FIG. 6 illustrates the structure of a purchase order list 500 which may be displayed to a user as part of a graphical user interface according to an exemplary embodiment. In the illustrated embodiment, purchase order list 500 is formatted as a table. Purchase order list 500 includes a header row 501 as well as a row 502 for each purchasing list item added to the purchase order list. For example, in the illustrated embodiment, purchase order list 500 includes rows 502a-502n. Purchase order list 500 also includes columns 504 for relevant purchasing data associated with each purchasing list item in the purchase order list. For example, in the illustrated embodiment, purchase order list 500 includes columns 504a-504k. Column 504a, labeled "No." in header row 501, includes the purchase list number from which the purchase order list line item was generated. For example, the purchase order list line items in rows 502a-502e were all generated from purchasing list number 12345678. Column 504b, labeled "Item" in header row 501, includes the purchasing list line item number for each purchasing list item in the purchase order list. For example, the purchase order list line items in rows 502a-502e represent line items 10-50 from purchasing list number 12345678. Column 504c, labeled "Origin" in header row 501, includes the origin of each purchase order list line item. The origin may come from the purchase list, an external system, or may be input manually. Column 504d, labeled "Article" in header row 501, includes the specific article number for each purchase order list line item. Column 504e, labeled "Latest PO Date" in header row 501, lists the latest possible date that a purchase order may be generated for each purchase order list line item. Column 504f, labeled "Vendor" in header row 501, lists the vendor for each purchase order list line item. Column 504g, labeled "Delivery Date GR Ramp" in header row 501, includes the required delivery date for each purchase order list line item. Column 504h, labeled "Price" in header row 501, includes the price for each purchase order list line item. Column 504i, labeled "Quantity" in header row 501, includes the required quantity for each purchase order list line item. Column 504j, labeled "UoM" in header row 501, includes the appropriate unit of measure for each purchase order list line item (e.g., cartons, pieces, etc.) Column 504k, labeled "Site" in header row 501, lists the delivery destination for each purchase order list line item. Of course, in other embodiments, additional, fewer, and/or different columns and rows of information or data may be displayed.

Figure 7:
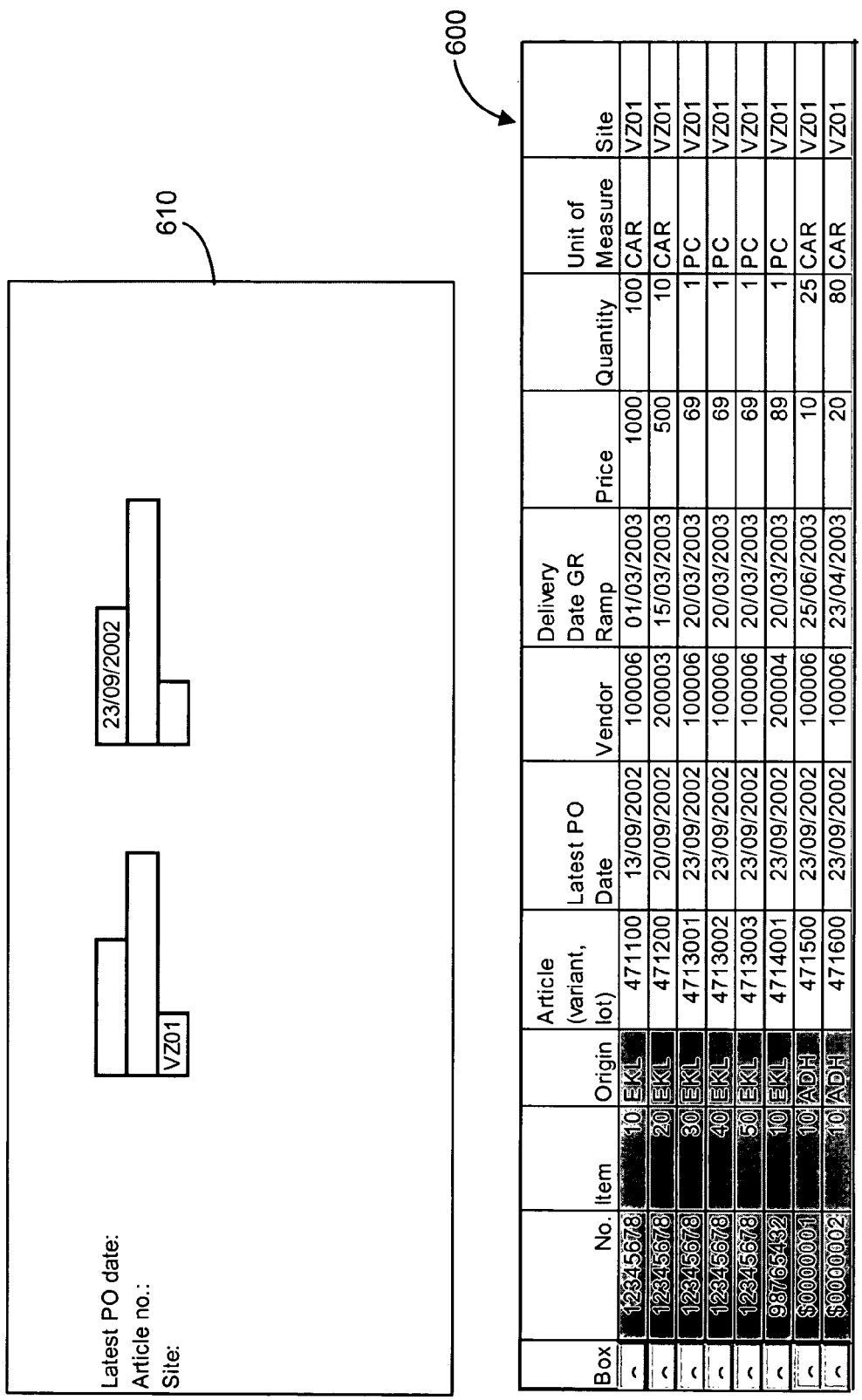
FIG. 7 illustrates the structure of a selection screen and purchase order list, according to an exemplary embodiment.

Purchase order list line items may be selectively accessed and displayed. For example, FIG. 7 illustrates a purchase order list 600 and a selection screen 610 which may be displayed as part of the graphical user interface in order to facilitate the selective accessing of purchase order list line items according to specific criteria according to an exemplary embodiment. Such criteria may include categories of relevant purchasing data associated with each purchasing list item in purchase order list 600. In the illustrated embodiment, the categories "Latest PO Date," "Article No.," and "Site" may be used in selection screen 610 to selectively access purchase order list line items. For example, in the illustrated embodiment, where the Latest PO Date "23 Sep. 2002" and the Site "VZ01" are entered in selection screen 610, purchase order list 600 is displayed including only those purchase order list line items corresponding to site VZ01 with a latest PO date prior to or on 23 Sep. 2002.

FIG. 8 illustrates a selection screen according to another exemplary embodiment. In this embodiment, additional categories include "Purchasing Organization," "Purchasing Group," "Vendor," "Material," "Plant," "Plant Category," "Delivery Date," "Firm Deal," "Release Indicator," and "Order Type."

Figure 9:
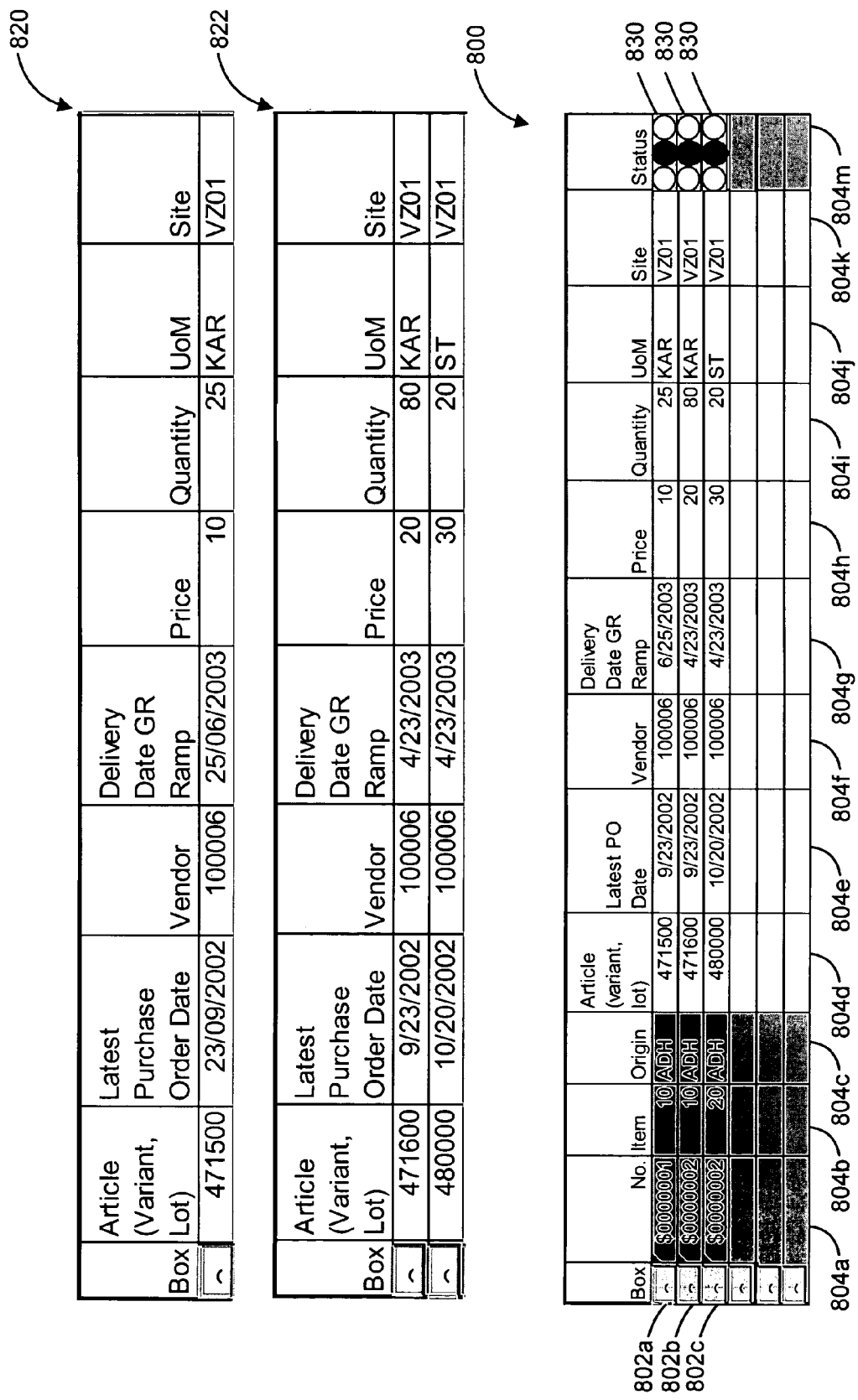
FIG. 9 illustrates the structure of a purchase order list having status indicators, according to an exemplary embodiment.

FIG. 9 illustrates the structure of a purchase order list 800 having status indicators 830 for each purchase order list line item according to an exemplary embodiment. In the illustrated embodiment, purchase order list 800 includes line items 802a, 802b, and 802c, which correspond to items from entries 820 and 822 (shown for reference). When each item is entered, purchase order list 800 adds each item as a purchase order list line item with columns 804a-804k, which contain the relevant purchasing data associated with each ad-hoc item. Purchase order list 800 also includes column 804m, which may contain an individual status identifier 830 for purchase order list line items 802a, 802b, and 802c.

Figure 10:
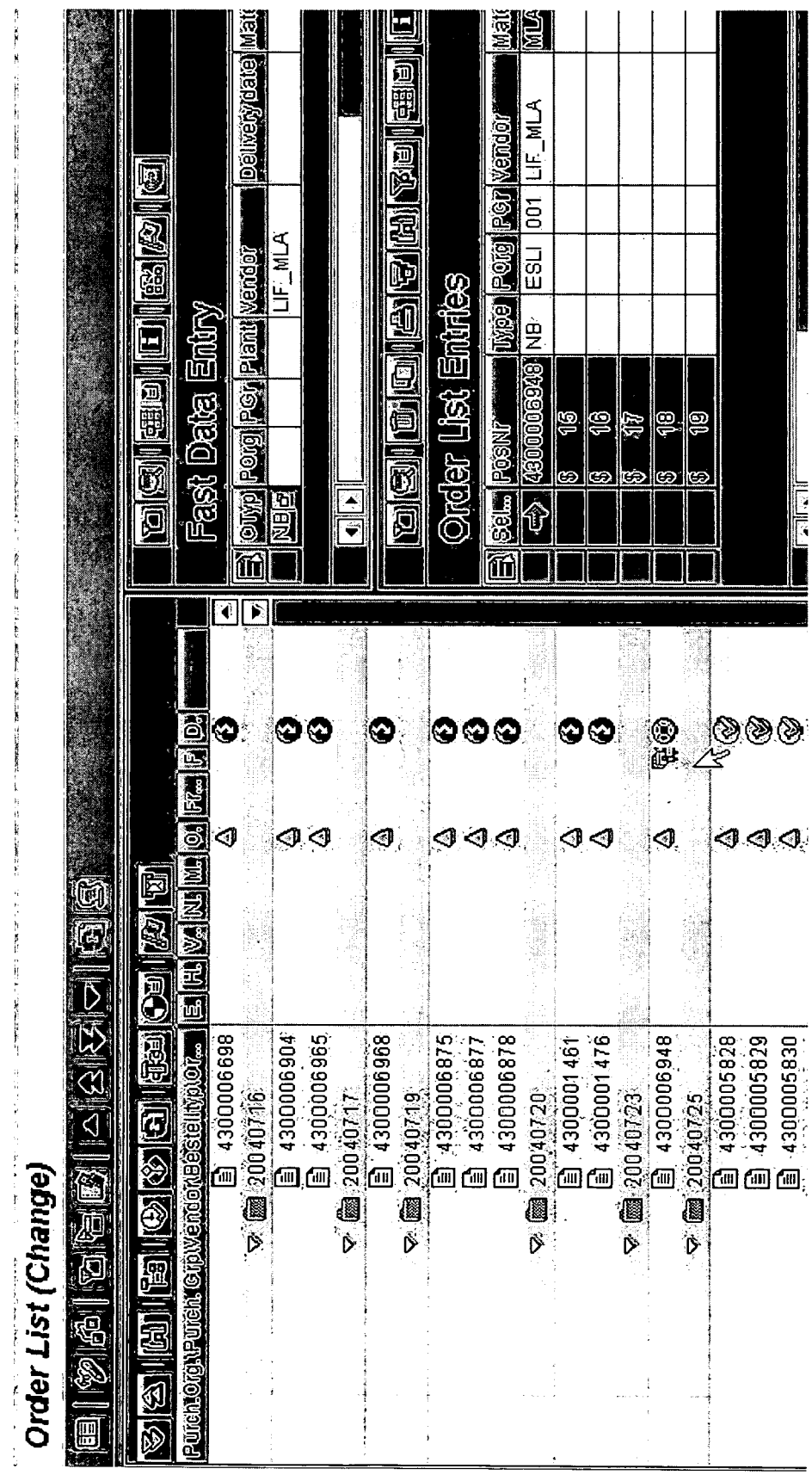
FIG. 10 illustrates status indicator configurations, according to another exemplary embodiment.

Status identifier 830 may be any of many possible configurations. In the illustrated embodiment, status identifier 830 consists of three circular areas, wherein each circular area is representative of a different status level, and the current status level is displayed by filling, highlighting, shading, or otherwise denoting the circular area corresponding to the current status (e.g., red, yellow, green colors of the circular areas). In another embodiment, status identifier 830 may include a different number of circular areas to indicate additional or fewer status levels. In yet another embodiment, status identifier 830 may include areas or icons of different shapes (e.g., square areas, triangular areas etc.) for indicating the current status. In yet another embodiment, status identifier 830 may include the use of different colors and/or changes in size or shape or other attributes of the appearance of a single area or icon, or of multiple areas or icons to indicate the current status (e.g., the use of an "X" or "check mark" or other character or symbol to modify the appearance of an area or icon). In yet another embodiment, status identifier 830 may include the use of alphanumeric text, such as a numeric scale (e.g., 1-10) to indicate the current status, wherein the number or other text indicates the current status. In yet another embodiment, a combination of area shapes, icons, colors, and/or alphanumeric text may be used to indicate a number of different possible status levels. Examples of other configurations of status indicators are shown in FIG. 10.

Referring again to FIG. 9, status identifier 830 may also indicate many different types of information. For example, in the illustrated embodiment, status indicator 830 may be used to indicate information as to whether a purchase order has been successfully generated for each line item in purchase order list 800. In this embodiment, a first one of the three circular areas may be used to indicate that a purchase order has been successfully generated for the particular line item, a second one of the three circular areas may be used to indicate that a purchase order has not yet been generated for the particular line item, and a third one of the three circular areas may be used to indicate that there is insufficient budget available to generate a purchase order (e.g., an unsuccessful OTB check). The appropriate circular area may then be filled, e.g., using one of the indication methods described above, to indicate the current status of each line item. For example, in one embodiment, a first one of the three circular areas may be displayed as filled with the color green to indicate that a purchase order has been successfully generated for the particular line item, a second one of the three circular areas may be displayed as filled with the color yellow to indicate that a purchase order has not yet been generated for the particular line item, and a third one of the three circular areas may be displayed as filled with the color red to indicate that there is insufficient budget available to generate a purchase order (e.g., an unsuccessful OTB check). In the illustrated embodiment, the middle circle has been filled to indicate that a purchase order has not yet been generated for each of the ad-hoc line items in purchase order list 800. According to various other embodiments, status identifier 800 may indicate other types of information, such as, for example, OTB information, date control information, allocation table information, firm deal information, release indicator information, etc.

Figure 11:
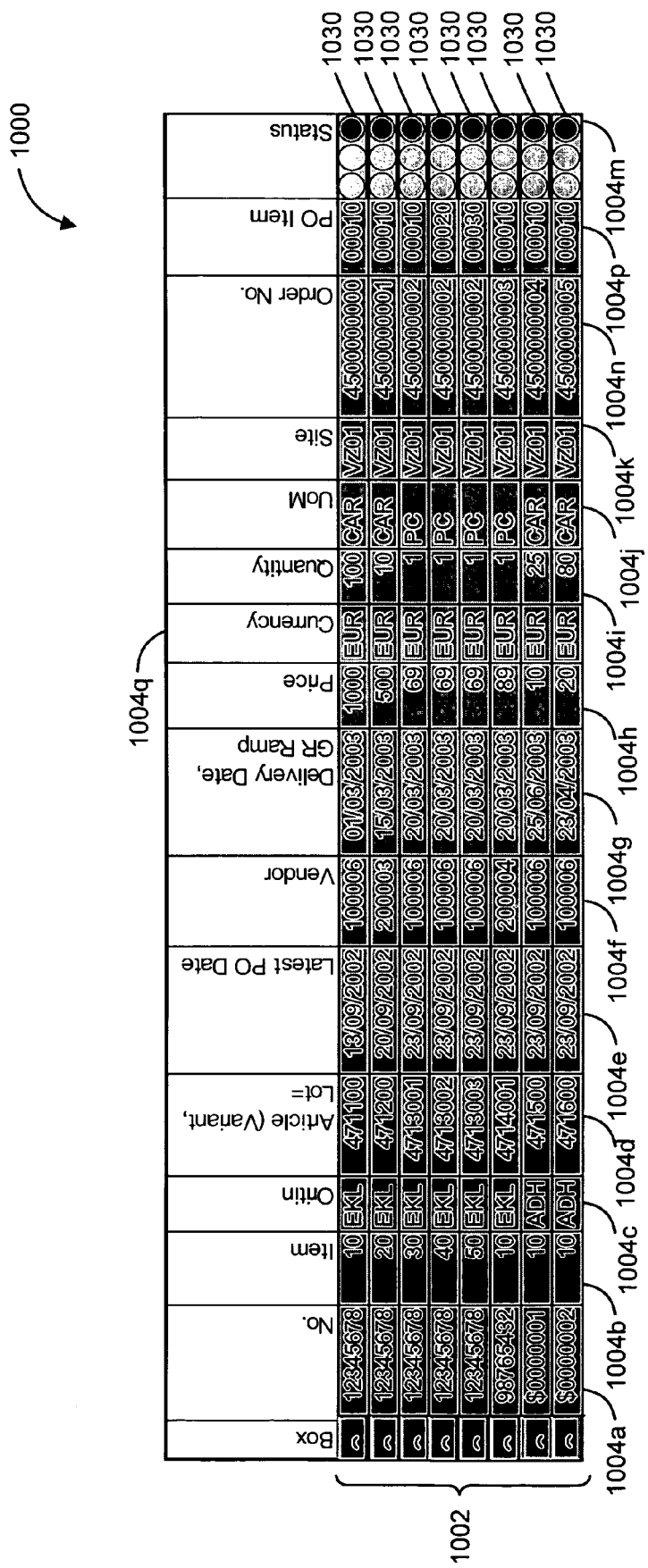
FIG. 11 illustrates the structure of a purchase order list having status indicators, according to another exemplary embodiment.

FIG. 11 illustrates the structure of a purchase order list 1000 having status indicators 1030 according to another exemplary embodiment. In the illustrated embodiment, purchase order list 1000 includes a number of line items 1002 and columns 1004*a*-1004*k*, which contain the relevant purchasing data associated with each purchase order list line item. Purchase order list 1000 also includes column 1004*m*, which may contain an individual status identifier 1030 for purchase order list line items 1020 to identify whether a purchase order has been successfully generated for each line item. For example, in the illustrated embodiment a first one of the three circular areas has been identified to indicate that a purchase order has been successfully generated for each line item 1002.

Purchase order list 1000 further includes columns 1004*n*, 1004*p*, and 1004*q*. Column 1004*n* is labeled "Order No.," and includes the purchase order number of the successfully generated purchase order for each line item 1002 in purchase order list 1000. Column 1004*p* is labeled "PO Item," and includes the item number from a particular purchase order number for each line item 1002 in purchase order list 1000. Column 1004*q* is labeled "Currency," and denotes the type of currency (e.g., euro, dollar, etc.) used in each successfully generated purchase order.

The use of a purchase order list provides the advantage of organizing purchasing data for retail sales articles and/or services to be purchased such that the generation of purchase orders for these articles and/or services may be conveniently managed. Improved purchase order management and organization is achieved by providing for the sorting of sales articles or services in the purchase order list according to a particular type of purchasing data related to the sales articles or services in the list, such as required order and delivery dates. Improved purchase order management and organization is further achieved by providing for the updating of the purchase order list to include data related to a specific purchase order generated for a particular retail sales article or service. In this way, a business may carefully plan and schedule purchasing orders for retail sales articles and services to ensure on-time procurement or scheduling.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of integrating planning, purchasing, and allocation of goods, the method comprising:
providing a purchase order workbench configured to generate a purchase order list based on purchasing data, regional marketing data, and competition data, the purchase order list including a plurality of items and associated purchasing data for each item;
providing a planning workbench configured to compare a cost of the purchase order list to a budget to generate a first result and a second result, the first result is the cost of the purchase order list being less than or equal to the budget, the second result is the cost of the purchase order list exceeding the budget;
generating by a processor a first purchase order when the first result occurs, the first purchase order being approved for purchase;
transmitting by the processor when the second result occurs, a request for an approval signal;
receiving by the processor the approval signal based on the request for an approval signal;
generating the first purchase order based on the second result occurring and receiving the approval signal, the first purchase order being approved for purchase;
providing an allocation workbench configured to generate an allocation table, the allocation table including at least one of the plurality of items from the purchase order list that has been approved for purchase, the allocation table including a designation of a sales location for each item; and
storing at least one of the first result, the second result and the first purchase order;
wherein the approval signal comprises instructions for approving the first purchase order where the cost of the purchase order list exceeds the budget.

2. The method of claim 1, further comprising modifying at least one of the purchase order list, the budget, and a budget rule to generate a second purchase order based on the second result, the second purchase order being approved for purchase.

3. The method of claim 2, wherein the budget rule is automatically applied to the purchase order list to generate the second purchase order and wherein the allocation table is automatically populated with approved items in the second purchase order.

4. The method of claim 1, further including providing a graphical user interface configured to receive one or more modifications to at least one of the first purchase order, the second purchase order and the allocation table.

5. The method of claim 4, wherein the allocation workbench is configured to add an item to at least one of the first purchase order and the second purchase order based on a modification to the allocation table.

6. The method of claim 1, wherein the plurality of items include at least one of a retail sales article and a service.

7. The method of claim 1, wherein the purchasing data includes data received from a purchasing list.

8. The method of claim 7, wherein the purchasing list is a list of retail sales articles and corresponding planned purchasing quantities for selected planning levels.

9. A computerized system for integrating planning, purchasing, and allocation of goods, the system comprising:

purchase order workbench means for providing a purchase order workbench for generating a purchase order list based on purchasing data, regional marketing data, and competition data, the purchase order list including a plurality of items and associated purchasing data for each item;
planning workbench means for providing a planning workbench for comparing a cost of the purchase order list to a budget to generate a first result and a second result, the first result is based on the cost of the purchase order list being less than or equal to the budget, the second result is based on the cost of the purchase order list exceeding the budget, the planning workbench means configured to generate a first purchase order when the first result occurs, the first purchase order being approved for purchase, the planning workbench means configured to transmit when the second result occurs, a request for an approval signal, the planning workbench means further configured to receive the approval signal based on the request for an approval signal, and the planning workbench means configured to generate the first purchase order based on the second result occurring and receiving the approval signal, the first purchase order being approved for purchase;
allocation workbench means for providing an allocation workbench for generating an allocation table, the allocation table including at least one of the plurality of items from the purchase order list that has been approved for purchase, the allocation table including a designation of a sales location for each item;
system interface means for providing a system interface configured to access the purchase order, planning, and allocation workbenches; and
storage means for storing at least one of the first result, the second result, and the first purchase order;
wherein the approval signal comprises instructions for approving the first purchase order where the cost of the purchase order list exceeds the budget.

10. The system of claim 9, wherein the planning workbench means is further configured to modify at least one of the purchase order list, the budget, and a budget rule to generate a second purchase order based on the second result, the second purchase order being approved for purchase.

11. The system of claim 10, wherein the budget rule is automatically applied to the purchase order list to generate the second purchase order and wherein the allocation table is automatically populated with approved items in the second purchase order.

12. The system of claim 9, further including providing a graphical user interface configured to receive one or more modifications to at least one of the first purchase order, the second purchase order and the allocation table.

13. The system of claim 12, wherein the allocation workbench is configured to add an item to at least one of the first purchase order and the second purchase order based on a modification to the allocation table.

14. The system of claim 9, wherein the plurality of items include at least one of a retail sales article and a service.

15. The system of claim 9, wherein the purchasing data includes data received from a purchasing list.

16. The system of claim 15, wherein the purchasing list is a list of retail sales articles and corresponding planned purchasing quantities for selected planning levels.

17. A non-transitory computer-readable medium comprising a computer-readable program code stored in the non-transitory computer-readable medium for causing, when executed by one or more processors an implementation of a method for integrating planning, purchasing, and allocation of goods, the method comprising:

generating via one or more processors a purchase order list based on purchasing data, regional marketing data, and competition data, the purchase order list including a plurality of items and associated purchasing data for each item;

comparing via one or more processors a cost of the purchase order list to a budget to generate a first result and a second result, the first result is based on the cost of the purchase order list being less than or equal to the budget, the second result is based on the cost of the purchase order list exceeding the budget;

generating via one or more processors a first purchase order when the first result occurs, the first purchase order being approved for purchase;

transmitting when the second result occurs, a request for an approval signal;

receiving the approval signal based on the request for an approval signal;

generating via one or more processors the first purchase order based on the second result occurring and receiving the approval signal, the first purchase order being approved for purchase;

providing via one or more processors an allocation table including at least one of the plurality of items from the purchase order list that has been approved for purchase, the allocation table including a designation of a sales location for each item; and storing at least one of the first result, the second result and the first purchase order;

wherein the approval signal comprises instructions for approving the first purchase order where the cost of the purchase order list exceeds the budget.

18. The method of claim 17, further comprising modifying at least one of the purchase order list, the budget, and a budget rule to generate a second purchase order based on the second result, the second purchase order being approved for purchase.

19. The method of claim 18, wherein the budget rule is automatically applied to the purchase order list to generate the second purchase order and wherein the allocation table is automatically populated with approved items in the second purchase order.

20. The method of claim 17, further including providing a graphical user interface configured to receive one or more modifications to at least one of the first purchase order, the second purchase order and the allocation table.

21. The method of claim 20, wherein the allocation workbench is configured to add an item to at least one of the first purchase order and the second purchase order based on a modification to the allocation table.

22. The method of claim 17, wherein the plurality of items include at least one of a retail sales article and a service.

23. The method of claim 17, wherein the purchasing data includes data received from a purchasing list.

24. The method of claim 23, wherein the purchasing list is a list of retail sales articles and corresponding planned purchasing quantities for selected planning levels.

\* \* \* \* \*